United States Patent

Anzai

Patent Number: 5,631,997
Date of Patent: May 20, 1997

[54] EQUALIZER USED FOR A VTR

[75] Inventor: Fukuji Anzai, Gunma-ken, Japan

[73] Assignee: Sanyo Electric Co., Ltd., Osaka, Japan

[21] Appl. No.: 652,751

[22] Filed: May 23, 1996

[30] Foreign Application Priority Data

May 25, 1995 [JP] Japan ................. 7-126659

[51] Int. Cl.$^6$ .............. H04N 5/91; H04N 7/00; G11B 5/035
[52] U.S. Cl. ................. 386/46; 386/113; 360/65
[58] Field of Search ............... 358/310, 315, 358/329, 335; 360/65; 348/711

[56] References Cited

U.S. PATENT DOCUMENTS

| | | | |
|---|---|---|---|
| 4,459,554 | 7/1984 | Mattisson | 330/107 |
| 4,484,237 | 11/1984 | Muto | 360/25 |
| 4,635,143 | 1/1987 | Suzuki et al. | 360/65 |
| 4,686,561 | 8/1987 | Harwood et al. | 358/31 |
| 4,723,175 | 2/1988 | Ichinoi et al. | 358/316 |
| 4,758,903 | 7/1988 | Noguchi et al. | 360/19.9 |
| 4,786,989 | 11/1988 | Okamura et al. | 360/65 |
| 5,105,275 | 4/1992 | Iizuka et al. | 358/167 |
| 5,121,266 | 6/1992 | Ito et al. | 360/65 |
| 5,124,850 | 6/1992 | Kizu | 360/33.1 |
| 5,258,879 | 11/1993 | Shimotashiro et al. | 360/77.14 |
| 5,287,385 | 2/1994 | Sugawara et al. | 375/12 |
| 5,311,306 | 5/1994 | Tanaka et al. | 348/105 |
| 5,349,444 | 9/1994 | Amano et al. | 348/711 |
| 5,519,676 | 5/1996 | Kitahara | 369/32 |

*Primary Examiner*—Thai Q. Tran
*Assistant Examiner*—Vincent F. Boccio
*Attorney, Agent, or Firm*—Loeb & Loeb LLP

[57] ABSTRACT

A video signal is read from a magnetic tape, and amplified by a head amplifier. The video signal then passes separately through first and second BPFs, the BPFs having respective passband characteristics so as to be applied to a first adding circuit. A first coefficient circuit multiplies the output from the first BPF by a positive coefficient while a second coefficient circuit multiplies the output from the second BPF by a negative coefficient. A second adding circuit adds all three signals, namely, signals from the first adding circuit and from the first and second coefficient circuits, and outputs the added signal to a trap circuit. The frequency characteristic of the equalizer can be adjusted by changing the coefficients in the first and second coefficients circuits. A change of the coefficients does not affect the level of the carrier component of a luminance signal.

5 Claims, 6 Drawing Sheets

EQUALIZER USED FOR A VTR

BACKGROUND OF THE INVENTION

1. Field of the Invention

The present invention relates to a home-use VTR (video tape recorder) for reproducing a video signal, and more particularly to a practical, integrated equalizer for a VTR, in which a change of equalizer characteristics does not affect a reproduction level of a video signal.

2. Description of the Prior Art

FIG. 1 shows an apparatus for reproducing a video signal which has been recorded on magnetic tape. A video signal is read from the magnetic tape 30 by a reproduction head 1 and supplied to a head amplifier 2 to be amplified before being applied to an equalizer 3. The equalizer 3 adjusts the frequency characteristics of the video signal so that the video signal's frequency characteristics are equal to those at the time of recording. After the video signal is equalized, it is applied to a subsequent FM demodulator 4 where a luminance signal is demodulated.

A typical equalizer is not usually an integrated circuit, and is generally comprised of discrete elements as shown in FIG. 2. Generally, a video signal is recorded with an overall frequency characteristic in which low and middle bands are enhanced, as is depicted in FIG. 3. In order to reproduce a video signal having such characteristics, the equalizer 3 must have the frequency characteristic shown in FIG. 4. In other words, the equalizer 3 reproduces a supplied video signal, based on the frequency characteristic shown in FIG. 4.

Referring to FIGS. 2, 4, and 5, a first trap circuit 5 removes a chroma signal (629 KHz, f1 in FIG. 4) from the video signal. A second trap circuit 6 removes any signals which have a frequency other than that of a video signal, that is, any out-band signals (f2 in FIG. 4). In this way, when the video signal passes through the first and second trap circuits 5 and 6, chroma and out-band signal components are removed. The remaining part of the video signal, that is, the luminance signal component, is then applied to the base of a transistor 7 which has its collector connected via a variable resistor 10 to a first band pass filter (BPF) 8, and its emitter connected to a second BPF 9. The first BPF 8 has a passband with center frequency f6 in FIG. 5 while the second BPF 9 has center frequency f7.

If the value of resistor 50 in FIG. 2 is adjusted, the characteristic curve of the first BPF 8 can be changed to the curve indicated by the chain line in FIG. 5. In this way, the overall characteristic curve shown in FIG. 5 can be transformed to match the curve in FIG. 4. When the characteristic curve of the first BPF 8 is changed, the level of a signal output from the first BPF 8 is also changed. This change in signal level, however, can be avoided by adjusting the variable resistor 10, which can be done easily, since the circuit in FIG. 2 has a discrete structure. More specifically, if the carrier component of the luminance signal has level A in FIG. 5, the level A can remain unchanged despite a change in the characteristic curve of the first BPF 8.

Since the characteristic curve shown in FIG. 5 varies depending on the design of a VTR, the variable resistor 10 is necessary for adjustment to match different input signals. As discussed above, because the circuit in FIG. 2 has a discrete structure, the characteristics thereof can be easily changed, however additional cost and layout space are used.

In order to solve this problem, the circuit in FIG. 2 has been rearranged as is shown in FIG. 6 to allow for circuit integration. The new circuit, that is, integrated circuit, comprises a first BPF 18 and a second BPF 19. The first BPF 18 has a characteristic curve indicated by solid line BPF 1 in FIG. 7, center frequency set at f6, while the second BPF 19 has a characteristic curve indicated by solid line BPF 2, center frequency set at f7. Referring again to FIG. 6, the circuit further comprises an adder circuit 11 for adding outputs from the first and second BPFs 18 and 19, the output of the adder circuit 11 is then sent through first and second trap circuits 5 and 6 to remove extra signals as described above.

As described above, in order to match the characteristic curve shown in FIG. 7 to the curve shown in FIG. 4, a variable resistor 12 is provided as shown in FIG. 6. When the value of the variable resistor 12 is adjusted, the characteristic curve BPF 1 indicated by a solid line in FIG. 7 can be modified so as to form the curves indicated by dotted lines in the same figure. In the circuit structure of FIG. 6, if the variable resistor 12 is provided outside of the integrated circuit, the frequency characteristic can be easily adjusted, and this circuit has a function equivalent to that of the circuit in FIG. 2.

The circuit of FIG. 6, however, has a problem in that the level A of the carrier component of the luminance signal is raised to level A2 by the adjustment of variable resistor 12 as shown in FIG. 7. If the level of the carrier component shifts from level A to level A2, the luminance signal has a larger dynamic range before it is applied to the FM demodulator 4. As a result, a discrepancy results between the characteristics of the signal and a conventional FM demodulator 4, which will consequently require the later to be re-designed.

Because of the above problems, an equalizer which can be easily integrated, and in which the signal level remains unaffected by a change of frequency characteristic is proposed.

SUMMARY OF THE INVENTION

The present invention therefore provides an equalizer which can be integrated and in which a change in the passband characteristic does not affect the level of a video signal output therefrom.

In order to achieve the object, the present invention is an equalizer used for a VTR for reproducing a video signal which has been recorded on a magnetic tape, comprising: a first BPF for passing a predetermined band of a video signal supplied from a head amplifier; a second BPF for passing a predetermined band of the video signal supplied from a head amplifier; a first adder circuit for adding the outputs of the first and second BPFs; a first coefficient circuit for multiplying the video signal output from the first BPF by a positive coefficient; a second coefficient circuit for multiplying the video signal output from the first BPF by a negative coefficient; and a second adder circuit for adding the video signals output from the first adding circuit and the first and second coefficient circuits.

The output from the first BPF is multiplied by a positive coefficient in the first coefficient circuit and applied to the second adding circuit. At the same time, the output from the second BPF is multiplied by a negative coefficient in the second coefficient circuit and also applied to the second adding circuit. The second adding circuit then adds the video signals output from the first adding circuit and the first and second coefficient circuits and outputs an added signal.

With this arrangement, the signal output from the second adding circuit has enhanced frequencies around the center frequency of the first BPF and attenuated frequencies around the center frequency of the second BPF. Therefore, by adjusting the positive and negative coefficients used in the coefficient circuits, the equalizer can be adjusted to have the desired passband frequency characteristic for reproducing a video signal recorded on a magnetic tape. Further, since the characteristics of an equalizer can be adjusted by only changing coefficients, the equalizer can be easily adapted to circuit integration, and, in addition, the level of the carrier component of a luminance signal constituting a video signal will remain unaffected by the change in the coefficients.

Using a negative coefficient, within a range from −1 to 0, for the second coefficient circuit in cooperation with a positive coefficient for the first coefficient circuit, an equalizer can easily obtain the desirable frequency characteristic.

In addition to the above, according to the present invention, the first BPF has a center frequency which is higher than the frequency of the carrier component of the luminance signal constituting the video signal, and the second BPF has a passband which is lower than the frequency of the carrier component.

In a VTR, a video signal is recorded on a magnetic tape, and the signal has an enhanced frequency which is lower than the frequency of the carrier component. Thus, when reproducing the recorded video signal, the equalizer must have a frequency characteristic opposite to that of the recorded video signal. When first and second BPFs are provided with passbands as described above, a recorded video signal can be properly reproduced.

Further, the equalizer of the present invention is provided with a trap circuit for extracting a luminance signal from the video signal received from the second adding circuit.

The trap circuit includes a first trap circuit for removing the frequency component of a chroma signal from the video signal, and a second trap circuit for removing components that are in a frequency band other than that of the video signal.

BRIEF DESCRIPTION OF THE DRAWINGS

The accompanying drawings are described as follows.

DESCRIPTION OF THE PREFERRED EMBODIMENTS

Figure 8:
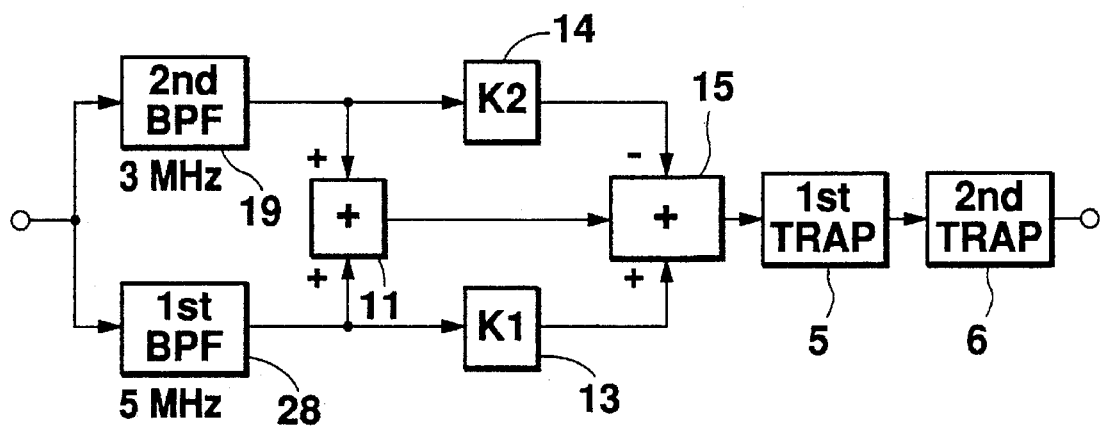
FIG. 8 is a block diagram showing the structure of an equalizer according to an embodiment of the present invention.

An equalizer for a VTR according to the present invention is shown in FIG. 8. It includes a first coefficient circuit 13 for giving a positive coefficient (K1) to a video signal output from a first BPF 28, a second coefficient circuit 14 for giving a negative coefficient (K2) to a video signal output from a second BPF 29, and an adding circuit 15 for adding the video signals output from an adder circuit 11 and the first and second coefficient circuits 13 and 14.

Figure 1:
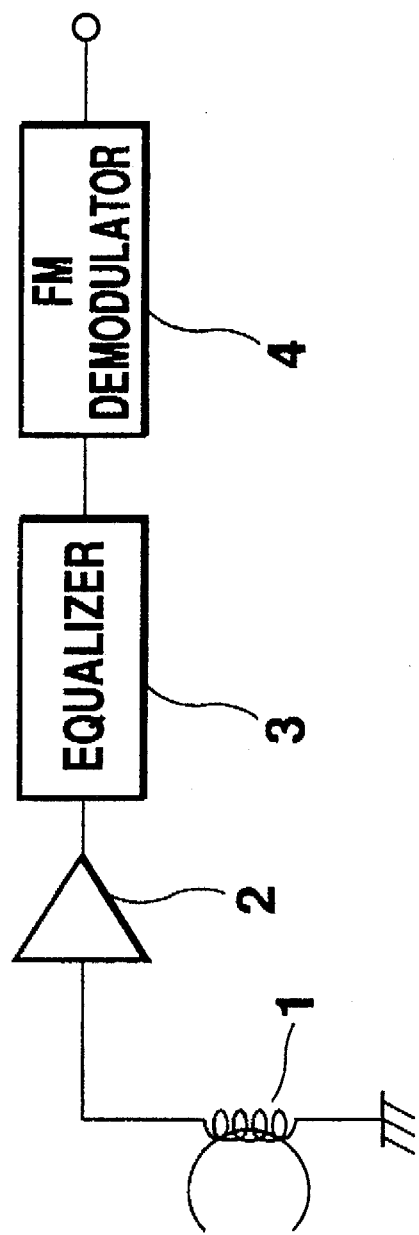
FIG. 1 is a block diagram showing the general structure of a conventional VTR.
Figure 2:
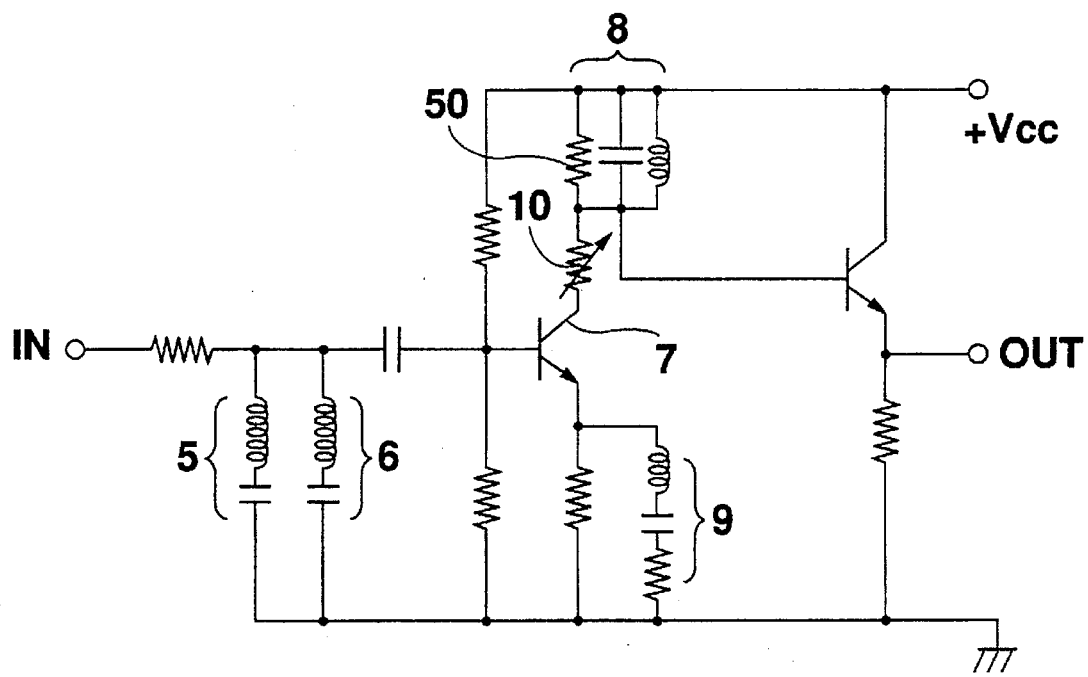
FIG. 2 is a circuit diagram showing the structure of a conventional equalizer.
Figure 3:
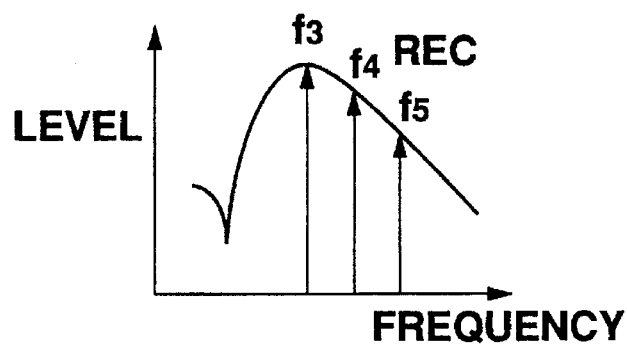
FIG. 3 shows the frequency characteristic of a video signal after being recorded on a magnetic tape.
Figure 4:
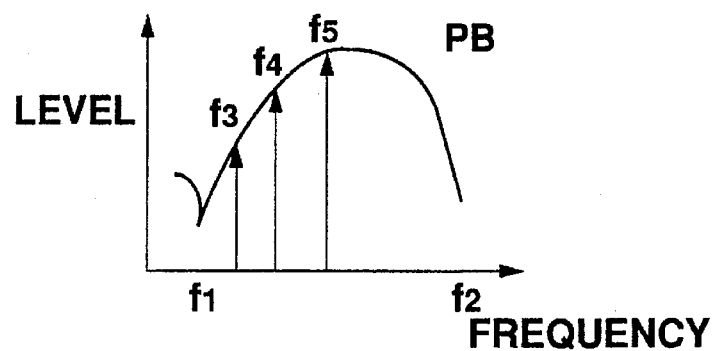
FIG. 4 shows the frequency characteristic that an equalizer must use for reproducing a video signal from a magnetic tape.
Figure 5:
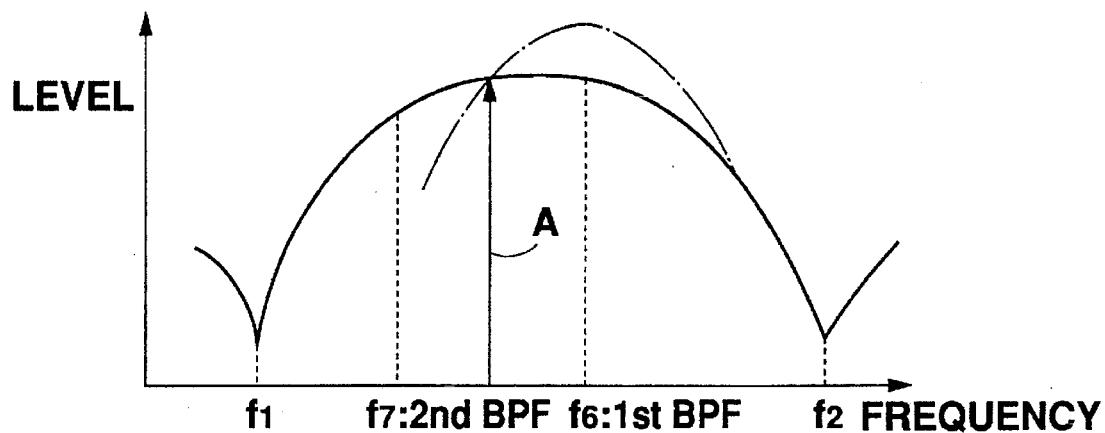
FIG. 5 is a diagram used to explain the frequency characteristics of the equalizer, and, in particular, the first and second BPFs 8 and 9, of FIG. 2.
Figure 6:
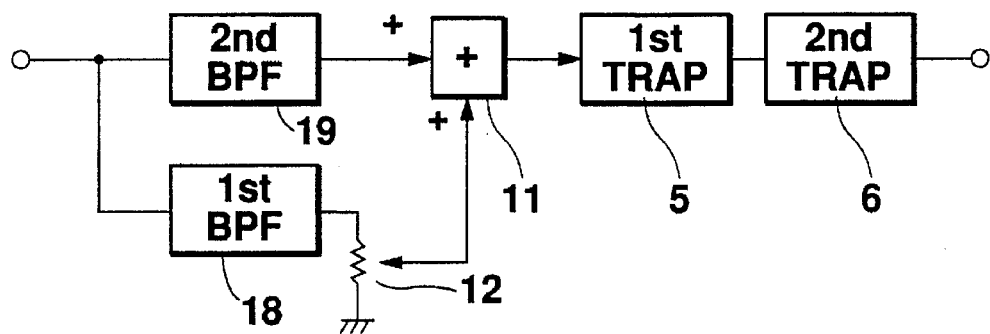
FIG. 6 is a block diagram showing an alternative structure of an equalizer.
Figure 7:
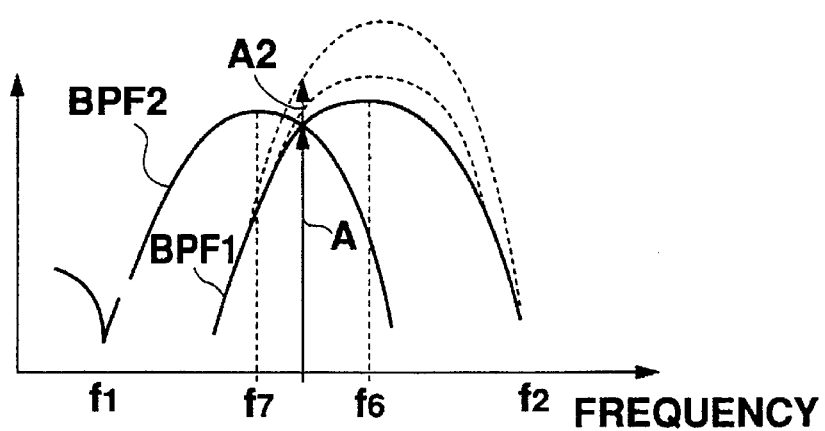
FIG. 7 is a diagram used to explain the frequency characteristics of the equalizer, and, in particular, the first and second BPFs 18 and 19, of FIG. 6.

Note that circuit elements that are the same as those in FIG. 6 are assigned with the same reference numerals, and their explanations are omitted.

The first BPF 28 and the second BPF 29 have their passband center frequencies set at 5 MHz and 3 MHz, respectively. The first trap circuit 5 has a cut-off frequency equal to the frequency of a chroma signal, that is, 629 kHz, and the second trap circuit 6 has a cut-off frequency equal to a frequency band which is outside that of a video signal, such as a frequency band from 7 MHz to 10 MHz.

The first and second BPFs 28 and 29 and the first and second trap circuits 5 and 6 comprise a plurality of differential amplifiers and capacitors.

Figure 9:
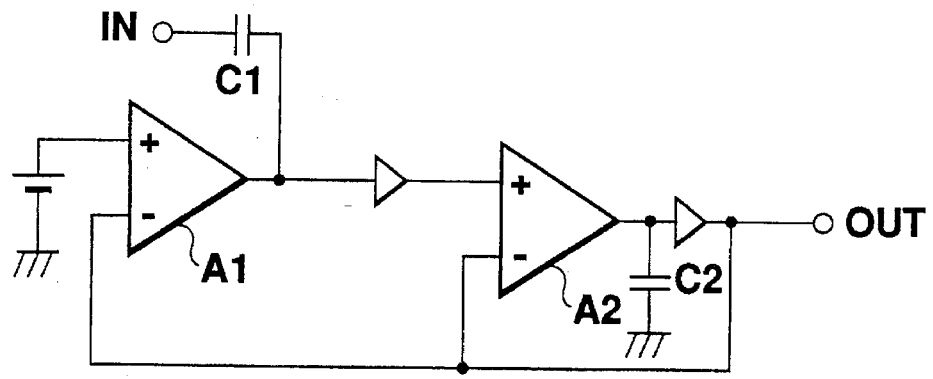
FIG. 9 is a schematic diagram of the circuit structure of the first and second BPFs 28 and 29 of FIG. 8.

For instance, the first and second BPFs 28 and 29 may have the structure shown in FIG. 9. A first differential amplifier A1 receives a reference Supply at its non-inverting (positive) input terminal. The input terminal IN of the BPF is connected, via a capacitor C1, between the output terminal of the first differential amplifier A1 and the non-inverting input terminal of a second differential amplifier A2. The output of the second differential amplifier A2 becomes the output terminal OUT of the BPF, and is also connected, via a capacitor C2, to ground. The output of the second differential amplifier A2 is also fed back to the inverting (negative) terminals of the first and second differential amplifiers A1 and A2. With this arrangement, the capacity of the capacitors C1 and C2 and the voltage of the reference supply are set at a predetermined value, thereby defining passband and cut-off frequencies for the BPF. Note that the cut-off frequency of the BPF can also be varied by changing the mutual conductance gm of the differential amplifiers A1 and A2 by altering the current value of the operating supply of the first and second differential amplifiers A1 and A2.

Figure 10:
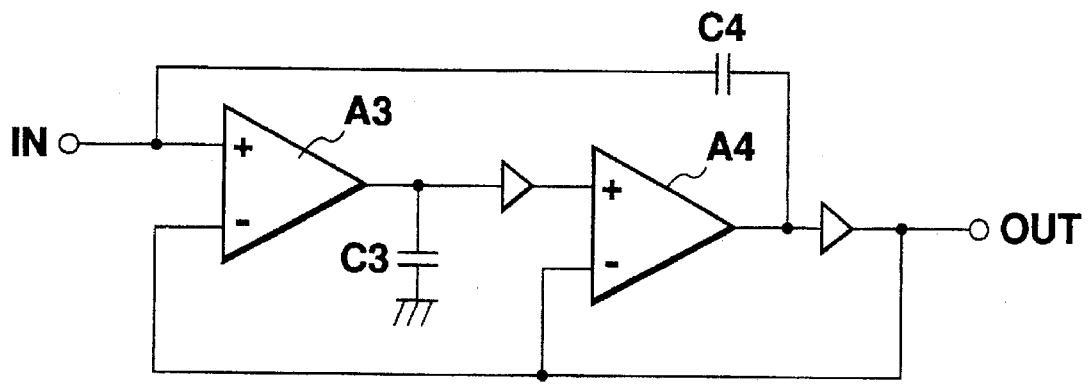
FIG. 10 is a schematic diagram of the circuit structure of the first and second trap circuits 5 and 6 of FIG. 8.

The first and second trap circuits 5 and 6 could have the structure shown in FIG. 10, in which the input terminal IN of the trap circuit is connected to the non-inverting input terminal of the first differential amplifier A3. The output terminal of the first differential amplifier A3 is connected to the non-inverting input terminal of the second differential amplifier A4 via a buffer, as well as to a capacitor C3, which is connected to ground. The output terminal of the second differential amplifier A4 is connected to the non-inverting terminal of the first differential amplifier A3 via a capacitor C4, and, via a buffer, to the output terminal OUT of the trap circuit. The output of the buffer, which is connected to the output terminal of the second differential amplifier A4, is also fed back to the inverting input terminals of the first and second differential amplifiers A3 and A4.

Similar to the case of the filter shown in FIG. 9, the trap circuit of FIG. 10 is arranged such that the cut-off frequency thereof can be determined based on the capacity of the capacitors C3 and C4 and the driving supply of the differential amplifiers A3 and A4. Thus, by setting these values, as described above, the cut-off frequency of the first trap circuit 5 is determined so as to remove the frequency component of a chroma signal, that is, 629 kHz, from a supplied video signal. The cut-off frequency of the second trap circuit 6 is determined so as to remove components in frequency bands outside the video signal band.

Figure 11:
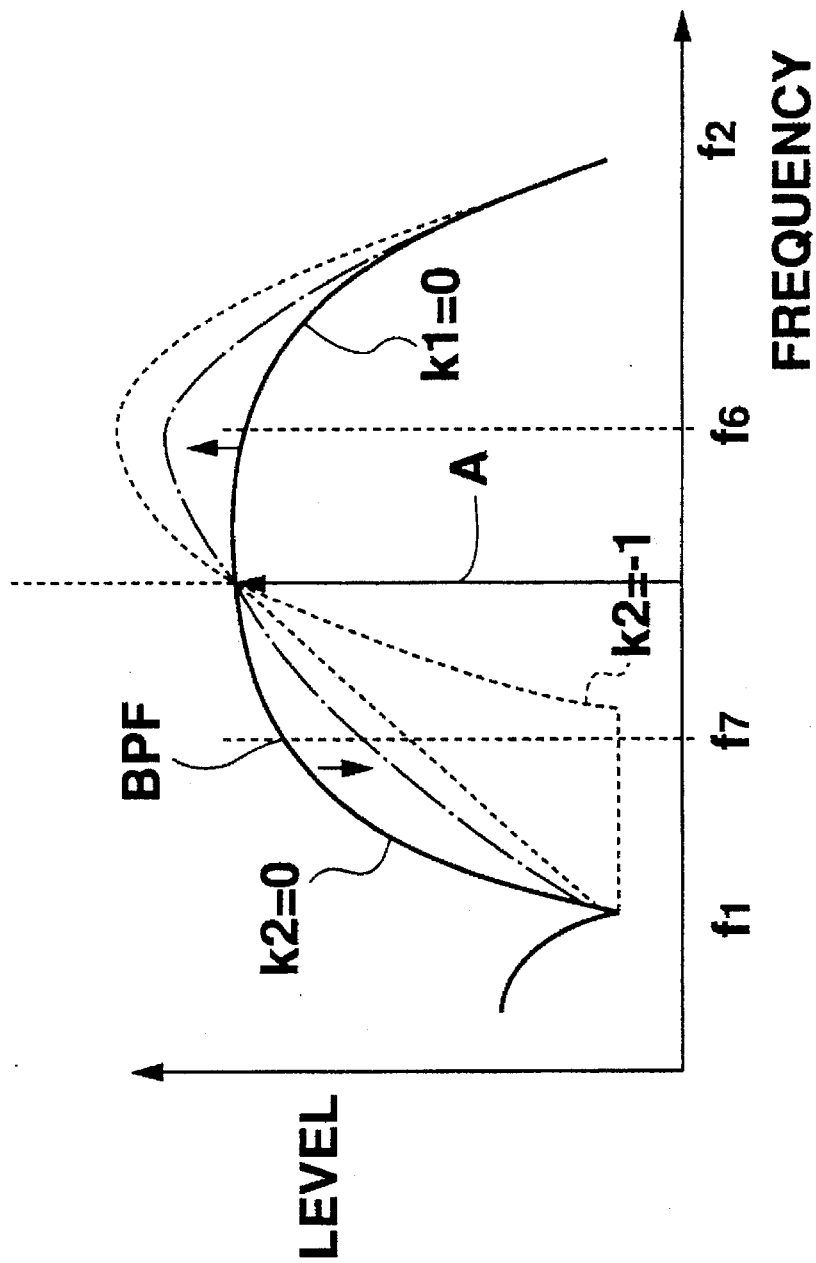
FIG. 11 is a diagram used to explain the frequency characteristics of the equalizer of FIG. 8.

The overall frequency characteristic of the circuit of FIG. 8 is shown in FIG. 11. The frequencies f1, f2, f6, and f7, are set at 629 kHz, 7 MHz, 5 MHz, and 3 MHz, respectively.

Referring to FIG. 8, the first BPF 28 outputs a signal having a frequency band with a center frequency f6 shown FIG. 11 while the second BPF 29 outputs a signal having a frequency band with a center frequency f7. The outputs of the first and second BPFs 28 and 29 are added together in the adding circuit 11, which outputs a signal having a relatively flat characteristic as shown by solid line BPF in FIG. 11.

The signal output from the first BPF 28 is also applied to the first coefficient circuit 13 and given a positive coefficient before being further applied to adding circuit 15. That is, the signal is multiplied by a positive coefficient, so that the first coefficient circuit 13 outputs an enhanced signal while maintaining frequency f6 as the center frequency.

On the other hand, the output of the second BPF 29 is applied to the second coefficient circuit 14 and given a negative coefficient before being applied to adding circuit 15. That is, the signal is multiplied by a negative coefficient, so that the second coefficient circuit 14 outputs an attenuated signal while maintaining center frequency f7.

The three outputs from the adding circuit 11 and the first and second coefficient circuits 13 and 14, are summed in the adding circuit 15, which in turn outputs a signal having frequency characteristics as indicated by the dotted line or the chain line in FIG. 11. By changing the coefficients used in the first and second coefficient circuits 13 and 14, the shape of the curve in FIG. 11 can be easily altered. The first and second coefficient circuits 13 and 14 can be easily incorporated in an integrated circuit, as using, for example, an electronic volume or a variable amplifier.

The coefficients will next be described with reference to FIG. 11. The positive coefficient (K1) used in the first coefficient circuit 13 may be equal to or more than 0, and, in this embodiment, is within a range from 0 to 1. The negative coefficient (K2) used in the second coefficient circuit 14 is equal to or less than 0, and, in this embodiment, is within a range from −1 to 0 with a minimum of −1.

When (K1) and (K2) are both 0 (K1=K2=0), both of the first and second coefficient circuits 13 and 14 output a signal of 0, so that the second adding circuit 15 outputs a signal equal to that from the first adding circuit 11 (see FIG. 11, solid line BPF).

As the positive coefficient (K1) is increased, the frequency characteristic of the signal output from the second adding circuit 15 is varied such that the frequency band with center frequency f6 also increases, creating the right side dotted line (K1=MAX).

On the other hand, as the negative coefficient (K2) is decreased, the characteristic is varied such that the frequency band with center frequency f7 also decreases, creating the left side dotted line (K2=MIN).

When the negative coefficient is −1, the 3 MHz output from the second BPF 29 is completely canceled to 0 by the second adding circuit 15, so that the second adding circuit 15 outputs a signal comprised solely of the output from the first BPF 28. If the negative coefficient takes a value less than −1, the signal may be distorted by the first BPF 28. For this reason, the minimum value of the negative coefficient (K2) is set at −1 in this embodiment.

The output of adding circuit 15 is then applied to the first and second trap circuits 5 and 6, where unnecessary components in the vicinity of frequencies f1 and f2 are removed, so that the equalizer can output an overall frequency characteristic as indicated by, for example, the chain line in FIG. 11.

As described in the above, the video signal output from the first and second BPFs are respectively multiplied by positive and negative coefficients by the first and second coefficient circuits, and added to a signal obtained by adding the video signals from the first and second BPFs. Therefore, by simply altering the value of coefficients used in the first and second coefficient circuits, the equalizer characteristics can be changed without affecting the level of the carrier component of the luminance signal. Further, with this arrangement, the equalizer can be easily made as an integrated circuit.

What is claimed is:

1. An equalizer used for a VTR for reproducing a video signal which has been recorded on a magnetic tape, comprising:

a first BPF for passing a predetermined band of a video signal supplied from a head amplifier;

a second BPF for passing a predetermined band of the video signal supplied from a head amplifier;

a first adder circuit for adding the outputs of the first and second BPFs;

a first coefficient circuit for multiplying the video signal output from the first BPF by a positive coefficient;

a second coefficient circuit for multiplying the video signal output from the second BPF by a negative coefficient; and a second adder circuit for adding the outputs of the first adding circuit and the first and second coefficient circuits.

2. An equalizer as defined in claim 1, wherein the first BPF has a passband which is higher, and the second BPF has a passband which is lower than the carrier frequency component of a luminance signal contained in the video signal.

3. An equalizer as defined in claim 1, wherein the negative coefficient takes a value in an inclusive range from −1 to 0.

4. An equalizer as defined in claim 1, further comprising:

a trap circuit for extracting a luminance signal from the video signal supplied by the second adding circuit.

5. An equalizer as defined in claim 4, wherein the trap circuit includes:

a first trap circuit for removing the frequency component of a chroma signal from the video signal supplied from the second adding circuit; and a second trap circuit for removing frequency bands other than the frequency band of the video signal, from the video signal.

\* \* \* \* \*